Aug. 4, 1931.    J. W. LATIMER    1,817,570
BRAKE SHOE
Original Filed April 15, 1929
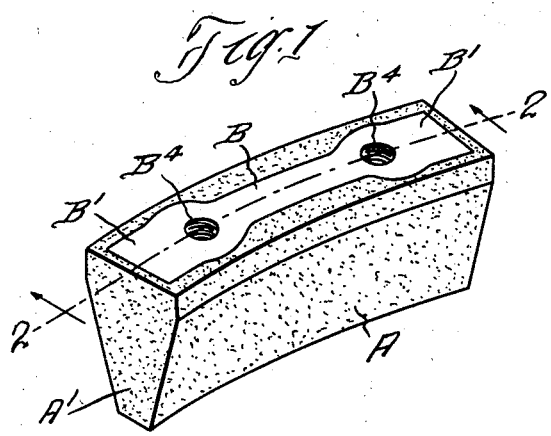
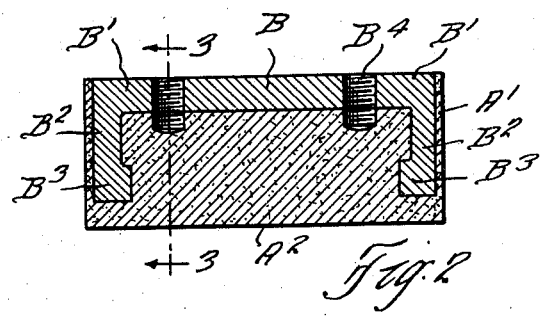
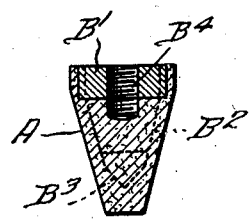
Inventor
John W Latimer
By Hull Brock & West
Attorney Patented Aug. 4, 1931

1,817,570

UNITED STATES PATENT OFFICE

JOHN W. LATIMER, OF LAKEWOOD, OHIO

BRAKE SHOE

Original application filed April 15, 1929, Serial No. 355,131. Divided and this application filed June 10, 1930. Serial No. 460,217.

This invention relates to a brake block of the type which is composed largely of a molded body of friction material provided with an inset reinforcement and attaching member. The principal object of the invention is to provide such a block which shall be simple in construction and of a strong and durable nature.

A further object is to provide a reinforcement entirely within the molded portion and so disposed as to secure a maximum of strength. Other and more specific objects will appear from the description and drawings.

This is a division of my application Serial No. 355,131, filed April 15, 1929 and is especially adapted for use in connection with the composition claimed in such application.

In the drawings, Fig. 1 represents a perspective view of such a block; Fig. 2 a sectional view corresponding to the line 2—2 of Fig. 1; and Fig. 3 is a sectional view corresponding to the line 3—3 of Fig. 2.

In preparing the composition, I employ the following ingredients and in approximately the proportions by weight specified hereinafter:

75 parts by weight of asbestos fiber; 19 to 22½ parts by weight of soft rubber; 6 to 2½ parts by weight of bakelite.

The asbestos may be ordinary asbestos or scrap asbestos, properly milled whereby it is broken up into short fibers. Where extra strength is desired in the article formed from the composition and the composition is not used for electrical insulating purposes, I prefer to incorporate copper wire with the asbestos; and the 75 parts by weight of asbestos stated hereinbefore will be with or without the added wire. The wire may be scrap wire or, where extra tensile strength is desired, the wire may consist of pieces extending the length of the article produced from the composition. Where wire is used, it is preferable to use from one to two strands of .007 wire to two strands of asbestos fiber.

The ingredients are milled together, the bakelite being added as a concentrated solution in alcohol, after which the resultant compound will be moulded to the desired shape.

For instance, when it is desired to use the compound for the production of brake blocks, it will be molded to shape and heated during this operation to a temperature of approximately 400° F., until the compound is cured. The average time required for this curing is one hour, the time varying with the thickness of the mass, and the compound, when cured, having a color approximating that of gray iron.

The bakelite (phenol-formaldehyde-resin) hardens the compound and raises the temperature of plasticity of the same, whereby it will withstand higher temperatures without softening; it also adds density to the compound and renders it more homogeneous than it would otherwise be; it also strengthens the compound and provides a smooth frictional surface which does not cut the cooperating brake band or other cooperating braking element. It is also vulcanizable with the rubber, the latter giving the compound the desired adhesiveness.

The compound when mixed and cured in the manner above set forth is impervious to moisture and insoluble in oils, greases or napthas, making it particularly adapted for use in brakes, clutches or wherever a friction surface is desired.

While the wire is undesirable when the compound is to be used for electrical insulating purposes, it is a desirable ingredient where the compound is used for other purposes, since it reinforces, toughens and strengthens the compound and, while it lowers the coefficient of friction, nevertheless it does not lower it to such an extent as to prevent the compound, when used for brake shoes, from making the wheels drag when the brakes are applied.

In the drawings, wherein my invention is shown as incorporated in a brake block, the block is indicated generaly at A and comprises a body made from the compound and molded to shape in the manner hereinbefore described. In order to strengthen this body, and particularly at the ends, there is molded into the same a metal insert, indicated generally at B and comprising a base which is molded into the widened base of the block A, the insert having widened end portions B' from the ends of which project studs B² adjacent to the ends A' of the block, the studs being tapered to approximate the contour of the ends of the block, the ends of the studs terminating within the narrow base A² of the said block, where each of the studs is provided with a projection B³, the projections extending toward each other and interlocking with the body of the block A. The widened ends B' of the insert are each provided with a threaded opening B⁴, the said threaded openings extending into the body of the block A. These openings are adapted to receive suitable screws or bolts for securing the brake block in place. The studs B² and the projections B³ prevent elongation and deformation of the brake block in the event that the parts of the block adjacent thereto become plastic.

Having thus described my invention, what I claim is:—

1. A brake block comprising a molded body of friction-creating material having a metal insert embedded therein, the said insert having ends substantially parallel with and located within the ends of said body and each provided at its extreme end with a projection, the said projections extending towards each other whereby the body is reinforced at its base and at its ends and is interlocked with said insert.

2. A brake block comprising a molded body of friction-creating material having a metal insert embedded therein, the said insert having downwardly projecting end portions, the outer faces of which are disposed adjacent the surface of the molded body and reinforcing means associated with said downwardly projecting end portions and extending inwardly therefrom whereby the molded body is reinforced at its ends and interlocked with said insert.

3. A brake block comprising a body made of a vulcanizable compound, said body having a base and ends extending from said base and a metal insert having its base embedded and molded within the base of the said body and having ends extending substantially parallel with the ends of said body and located within such ends, the extreme ends of the end portions of said insert being provided with extensions directed toward each other whereby the insert is interlocked with the said body and the said insert and the said body being provided with threaded openings whereby the block may be secured to a supporting base.

In testimony whereof, I hereunto affix my signature.

JOHN W. LATIMER.